(12) United States Patent
Li et al.

(10) Patent No.: US 12,170,862 B2
(45) Date of Patent: Dec. 17, 2024

(54) 10G RATE OLT TERMINAL TRANSCEIVER INTEGRATED CHIP BASED ON XGPON WITH DFB LASER

(71) Applicant: XIAMEN EOCHIP SEMICONDUCTOR CO., LTD, Xiamen (CN)

(72) Inventors: Jinghu Li, Xiamen (CN); An Lin, Xiamen (CN); Zhang Fan, Xiamen (CN)

(*) Notice: Subject to any disclaimer, the term of this patent is extended or adjusted under 35 U.S.C. 154(b) by 0 days.

(21) Appl. No.: 18/323,352

(22) Filed: May 24, 2023

(65) Prior Publication Data

US 2023/0388682 A1 Nov. 30, 2023

(30) Foreign Application Priority Data

May 24, 2022 (CN) .......................... 202210575982.1

(51) Int. Cl.
*H04B 10/038* (2013.01)
*H04B 10/079* (2013.01)
*H04Q 11/00* (2006.01)

(52) U.S. Cl.
CPC ....... *H04Q 11/0067* (2013.01); *H04B 10/038* (2013.01); *H04B 10/0795* (2013.01)

(58) Field of Classification Search
CPC .............. H04Q 11/0067; H04B 10/038; H04B 10/0795

(Continued)

(56) References Cited

U.S. PATENT DOCUMENTS 9,806,843 B2 * 10/2017 Eiselt ................. H04J 14/0272
10,855,375 B2 * 12/2020 Xu ..................... H04B 10/25891
(Continued)

FOREIGN PATENT DOCUMENTS

CN 101145848 A 3/2008
CN 101185247 A 5/2008
(Continued)

OTHER PUBLICATIONS

Xu, Huadong, 10G PON Technology development and network construction, Guangdong Communication Technology, Issue 01, Jan. 15, 2015, p. 1-5.

*Primary Examiner* — Mohammad R Sedighian
(74) *Attorney, Agent, or Firm* — Novoclaims Patent Services LLC; Mei Lin Wong

(57) ABSTRACT

A 10 G rate OLT terminal transceiver integrated chip based on XGPON and DFB laser includes: a burst mode receiver RX, a continuous mode transmitter TX and a digital control unit DIGIITAL. The burst mode receiver RX amplifies an optical signal from each ONU client into an electrical signal through a burst TIA, processes double-detection for amplitude and frequency of the electrical signal, outputs the signal whose amplitude and waveform pulse width meet the threshold requirements to the host, and uses a fast recovery module to control the timing to meet the XGPON protocol. The continuous mode transmitter TX receives the electrical signal attenuated by the PCB, and selects the bypass BYPASS path or the clock data recovery CDR path according to the degree of attenuation. The digital control unit DIGIITAL is used to provide control signals for the burst mode receiver RX and the continuous mode transmitter TX.

9 Claims, 4 Drawing Sheets

(58) Field of Classification Search
USPC .......................................................... 398/58
See application file for complete search history.

(56) References Cited

U.S. PATENT DOCUMENTS

| | | | | |
|---|---|---|---|---|
| 11,356,180 B2* | 6/2022 | McNicol | ............... | H04B 10/524 |
| 11,689,308 B2* | 6/2023 | Ghuman | ................. | H04J 14/02 |
| | | | | 398/79 |
| 11,916,600 B2* | 2/2024 | Li | ....................... | H04Q 11/0067 |

FOREIGN PATENT DOCUMENTS

| | | |
|---|---|---|
| CN | 206272624 A | 6/2017 |
| JP | 2013219599 A | 10/2013 |
| WO | 2013036945 A1 | 3/2013 |

* cited by examiner

10G RATE OLT TERMINAL TRANSCEIVER INTEGRATED CHIP BASED ON XGPON WITH DFB LASER

FIELD OF INVENTION

The present invention relates to the field of integrated circuit and optical communication.

DESCRIPTION OF RELATED ARTS

In an optical communication central office equipment OLT (abbreviation for Optical Line Termination, optical line terminal), a burst LA (limiting amplifier) completes the limit amplification of the different amplitude electrical signals transmitted by the upper burst transimpedance amplifier TIA. LA also includes a LOS (Loss of Signal, loss of signal) module, which judges whether the input signal of LA meets the requirements of the transmission protocol and performs the operation of turning off or opening the main channel. The continuous LDD (Laser Diode Driver) converts the data flow of the electrical signal into a modulated current to drive the laser to emit light and transmit the optical signal. The LDD includes a threshold configuration module to cooperate with the APC (automatic optical power control) and ATC (automatic temperature control) modules to complete the feedback control of the LDD.

The passive optical network are generally divided into three specific implementation methods: APON (abbreviation of ATM-Passive Optical Network, ATM passive optical network) based on ATM transmission protocol, EPON (abbreviation of Ethernet Passive Optical Network, Ethernet wireless network) based on Ethernet Source Optical Network), and GPON (abbreviation for Gigabit-capable Passive Optical Network, Gigabit-capable Passive Optical Network) with a rate above Gbit. Among these three implementations, GPON can provide higher speed, higher access performance and network efficiency, and stronger flexibility and scalability. It can meet the bandwidth requirements of various existing and future services.

However, with the competition in the market and the advancement of the new era, it is necessary to upgrade the architecture and speed of the OLT transceiver integrated chip of the central office equipment based on GPON technology.

Therefore, in view of the above deficiencies, it is necessary to upgrade the rate of the OLT terminal based on the GPON standard so that it can meet the needs of the market and achieve low cost and high rate.

SUMMARY OF THE PRESENT INVENTION

An object of the present invention is to solve the existing low rate problem of the existing OLT terminal based on GPON standard, and provides a 10 G rate OLT terminal transceiver integrated chip based on XGPON and DFB laser.

According to the present invention, a 10 G rate OLT terminal transceiver integrated chip based on XGPON and DFB laser comprises: a burst mode receiver RX, a continuous mode transmitter TX and a digital control unit DIGITAL.

The burst mode receiver RX amplifies an electrical signal which is originated from an optical signal from each ONU client and processed through a burst TIA, processes double-detection for amplitude and frequency of the electrical signal, to determine if an amplitude and a waveform pulse width of the electrical signal meet the threshold requirements, and outputs a detection result of the electrical signal to a host, and uses a fast recovery module to control the timing to meet the XGPON protocol.

The continuous mode transmitter TX receives the electrical signal attenuated by the PCB board, and according to the degree of attenuation, selects the bypass BYPASS path for transmission or outputs the signal after the signal quality is improved through the clock data recovery CDR path.

The digital control unit DIGITAL is used to provide control signals for the burst mode receiver RX and the continuous mode transmitter TX.

Preferably, the burst mode receiver RX comprises a pre-amplifier Pre_Amplifier, a signal detection unit, a 2.5 G burst limiting amplifier BurstLA 2.5 G, a current mode logic output buffer CML Buffer, a signal detection output buffer Buffer and a fast recovery module, wherein the signal detection unit comprises a level detector LEVEL DETECTOR and a frequency detector FREQUENCY DETECTOR;

an non-inverting input and an inverting input of the pre-amplifier Pre_Amplifier are arranged to receive a burst data packet from the burst transimpedance amplifier TIA; the fast recovery module is arranged to provide a fast recovery circuit to ensure the timing is correct, so that physical collision of two burst data packets before and after is avoided.

an output terminal of the pre-amplifier Pre_Amplifier is simultaneously connected to an input terminal of the 2.5 G burst limiting amplifier BurstLA 2.5 G and an input terminal of the signal detection unit.

an output terminal of the 2.5 G burst limiting amplifier BurstLA 2.5 G is connected to an input terminal of the current mode logic output buffer CML Buffer.

an output terminal of the signal detection unit is simultaneously connected to an input terminal of the signal detection output buffer Buffer and a control terminal for opening and closing of the current mode logic output buffer CML Buffer;

two output terminals of the current mode logic output buffer CML Buffer are connected to output pins RX_OUTP and RX_OUTN of the burst mode receiver RX respectively.

an output of the signal detection output buffer Buffer is connected to a chip pin RX_SD, and the burst mode receiver RX sends a detection result to the host through the chip pin RX_SD.

When a reset signal sent by a chip pin LA_RESET from the host, the chip sends a feedback signal to the host through the pin RX_SD.

Preferably, the fast recovery module is built-in or external to the burst mode receiver RX. The fast recovery module includes resistors R7, R8, R9, R10, and switches S1, S2;

when the fast recovery module is external to the burst mode receiver RX, a non-inverting output terminal of the burst transimpedance amplifier TIA is connected to one end of the resistor R10 of the fast recovery module, one end of the resistor R8 and a non-inverting input pin RX_INP of the chip through an AC coupling capacitor C9;

an inverting output terminal of the burst transimpedance amplifier TIA is connected to one end of the resistor R9 and one end of the resistor R7 of the fast recovery module, and an inverting input pin RX_INN of the chip through the AC coupling capacitor C8;

a non-inverting input pin RX_INP of the chip and an inverting input pin RX_INN of the chip are connected to a non-inverting input terminal and an inverting input terminal of the pre-amplifier Pre_Amplifier respectively;

another end of the resistor R10 is connected to one end of the switch S1;

another end of the resistor R9 is connected to one end of the switch S2;

control ends of the switches S1 and S2 are connected to a reset signal line LA_RESET simultaneously; and a reference voltage pin Vref of the burst mode receiver RX is simultaneously connected to another end of the resistor R7, another end of the R8, another end of the switch S1 and another end of the switch S2.

When the fast recovery module is built in the burst mode receiver RX, a non-inverting output terminal and an inverting output terminal of the burst transimpedance amplifier TIA are connected to a non-inverting input pin RX_INP and an inverting input pin RX_INN of the chip through an AC coupling capacitor C9 and C8;

inside the chip, the non-inverting input pin RX_INP of the chip is connected to one end of the resistor R10, one end of the resistor R8 and the non-inverting input terminal of the pre-amplifier Pre_Amplifier;

the inverting input pin RX_INN of the chip is connected to one end of the resistor R9, one end of the resistor R7 and the inverting input of the pre-amplifier Pre_Amplifier;

another end of the resistor R10 is connected to one end of the switch S1;

another end of the resistor R9 is connected to one end of the switch S2;

control ends of the switches S1 and S2 are connected to a reset signal line LA_RESET of the chip simultaneously;

a reference voltage Vref of the burst mode receiver RX is simultaneously connected to another end of the resistor R7, another end of the R8, another end of the switch S1 and another end of the switch S2.

Preferably, the continuous mode transmitter TX comprises an input buffer Input Buffer, a bypass ByPass, a clock data recovery CDR, a DFB laser driver, a bias current control unit and a modulation current control unit, one of the bypass ByPass or the clock data recovery CDR path is selected to activate;

an attenuated signal formed by an original high-speed electrical signal passing through a metal trace on a PCB is connected to the input buffer Input Buffer through the chip pins TX_INP and TX_INN, then the input buffer Input Buffer transmits the attenuated signal to the input end of the DFB laser driver along an open path;

a bias current output terminal of the bias current control unit is connected to the chip pin BIAS, and provides a bias current for the DFB laser;

a modulation current output terminal of the modulation current control unit is connected to a modulation current input terminal of the DFB laser driver;

an output terminal of the DFB laser driver is connected to the chip pins TX_OUTP and TX_OUTN, and the DFB laser driver provides modulation current for the DFB laser;

the host computer sends commands to the chip to turn off the bias current and the modulation current through the chip pin TXDIS to turn off the continuous mode transmitter TX.

Preferably, the activation of one of the bypass ByPass or the clock data recovery CDR path is controlled by digital control unit Digital according to an external command.

Preferably, the activation of one of the bypass ByPass or the clock data recovery CDR path is controlled through the host automatically switching the channel by itself, when the rate is below 8 G, the signal attenuation is not serious, and the bypass ByPass is activated; when the rate is 8 G-14 G, the signal attenuation is serious, and the clock data recovery CDR path is activated under the control of the host.

Preferably, the digital control unit Digital comprises a register digital core, an analog-to-digital converter ADC, a $I^2C$ slave and temperature sensor Temp Sensor;

an output terminal of the temperature sensor Temp Sensor is connected to a temperature signal input terminal of the register digital core through the analog-to-digital converter ADC;

an input terminal of $I^2C$ slave is connected to a pin SCL of a clock chip; an input and output ports of $I^2C$ slave are connected to a pin SDA of an external command chip; an output terminal of $I^2C$ slave is connected to an external command input terminal of the register digital core, and the register digital core controls a path selection of the continuous mode transmitter TX; the register digital core also realizes a configuration of the burst mode receiver RX and the continuous mode transmitter TX through a control port.

Preferably, the control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

Preferably, the control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL;

an input terminal of the optical power control port APC is connected to a chip pin MPD for monitoring current.

The advantageous effect of the present invention: The present invention provides a circuit structure of a 10 G rate OLT terminal transceiver integrated chip based on XGPON and DFB laser. On the basis of the GPON protocol architecture, the rate is further improved, and the downlink continuous data rate is increased from the basic 2.5 Gbps to 10 Gbps, and the uplink burst data rate remains at 2.5 Gbps, which greatly improves the download rate to the ONU at the user end, and is compatible with DFB lasers, which is cheaper than EML lasers, to emit and transmit data.

The present invention provides an overall framework structure of a 10 G rate OLT terminal transceiver integrated chip based on XGPON and DFB laser, which includes a 2.5 Gbps burst LA, a 10 Gbps continuous LD with CDR that can be turned off or turned on, a digital module to optimize eye diagram transmission quality, and a low cost DFB lasers, therefore the final cost of the transceiver integrated chip can be reduced.

DETAILED DESCRIPTION OF THE PREFERRED EMBODIMENT

The following will clearly and completely describe the technical solutions in the embodiments of the present invention with reference to the accompanying drawings in the embodiments of the present invention. Clearly, the described embodiments are only some, not all, of the embodiments of the present invention. Based on the embodiments of the present invention, all other embodiments obtained by persons of ordinary skill in the art without creative efforts or inventive steps fall within the protection scope of the present invention.

According to the present invention, a 10 G rate OLT terminal transceiver integrated chip based on XGPON and DFB laser is provided. The fast recovery circuit in the receiver (RX) within the chip frame, the double detection of amplitude and frequency of the electrical signal from the TIA, the switchable start-stop clock data recovery (CDR) module in the transmitter (TX), the ability to drive the laser driver of the DFB laser, and the modular and configurable digital part (Digital) are the key to the realization of the present invention.

It should be noted that as long as there is no conflict, the different embodiments or the different features in different embodiments can be combined with each other.

The present invention is further described in conjunction with accompanying drawings and specific embodiment as follows, which is not intended to be limiting.

Embodiment 1: This embodiment is described below with reference to FIGS. 1-4. According to this embodiment, a 10 G rate OLT terminal transceiver integrated chip based on XGPON and DFB laser comprises: a burst mode receiver RX, a continuous mode transmitter TX and a digital control unit DIGITAL.

The burst TIA processes an optical signal from each ONU client into an electrical signal, then the burst-mode receiver RX amplifies the electrical signal, processes double-detection for amplitude and frequency of the electrical signal to determine if an amplitude and a waveform pulse width of the electrical signal meet the threshold requirements, and outputs a detection result of the electrical signal to a host, and uses a fast recovery module to control the timing to meet the XGPON protocol.

The continuous mode transmitter TX receives the electrical signal attenuated by the PCB board, and according to the degree of attenuation, selects the bypass BYPASS path for transmission or outputs the signal after the signal quality is improved through the clock data recovery CDR path.

The digital control unit DIGITAL is used to provide control signals for the burst mode receiver RX and the continuous mode transmitter TX.

Figure 1:
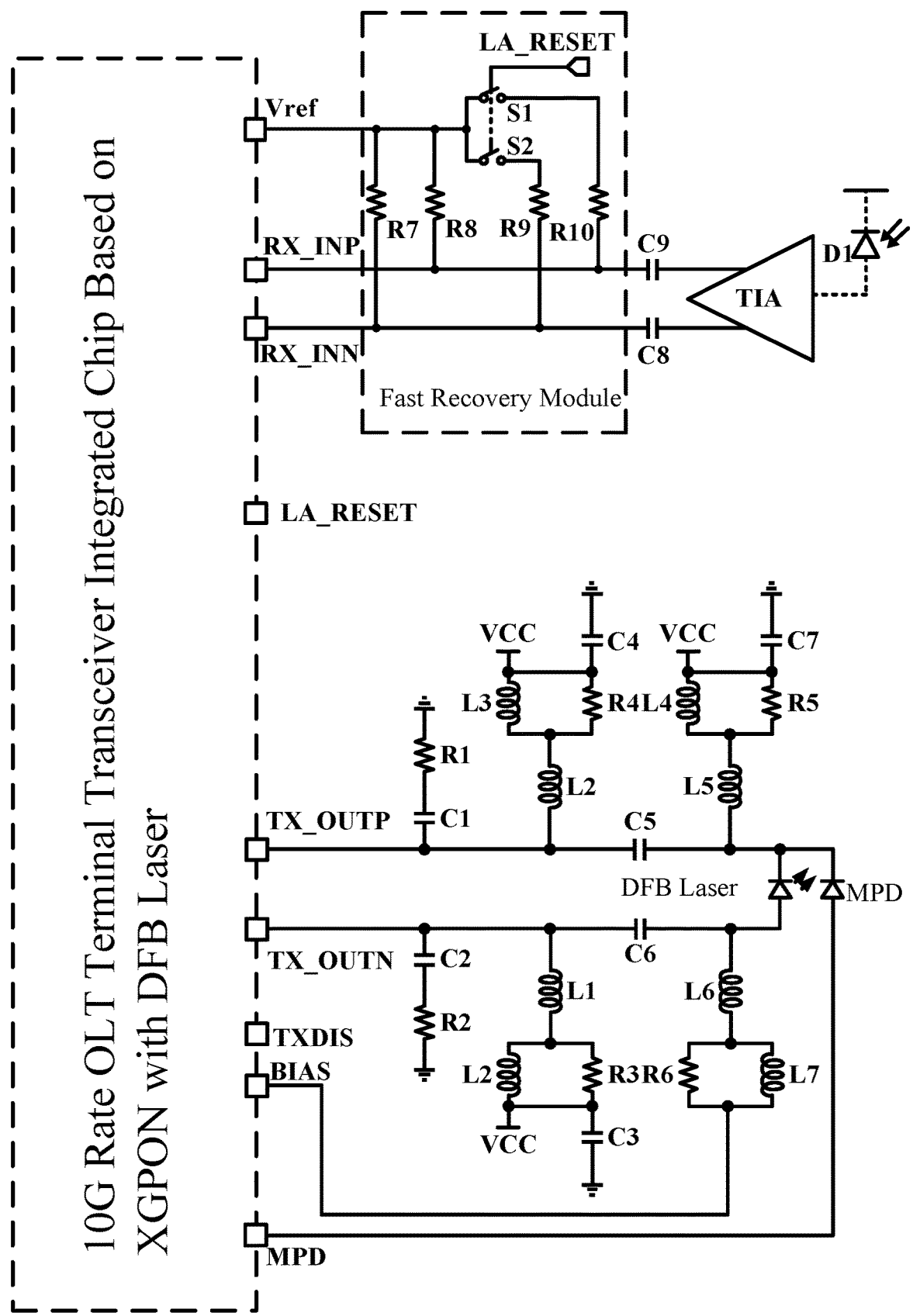
FIG. 1 is a schematic diagram based on XGPON with DFB laser, and an external fast recovery circuit according to the present invention.

This embodiment is equipped with a DFB laser and its external fast recovery circuit is illustrated in FIG. 1, which comprises resistors R1~R6, capacitors C1~C7, inductors L1~L7 and monitoring diode MPD, wherein a monitoring current is led to the chip MPD pin through the monitoring diode MPD.

The burst mode receiver RX comprises a pre-amplifier Pre_Amplifier, a signal detection unit, a 2.5 G burst limiting amplifier BurstLA 2.5 G, a current mode logic output buffer CML Buffer, a signal detection output buffer Buffer and a fast recovery module, wherein the signal detection unit comprises a level detector LEVEL DETECTOR and a frequency detector FREQUENCY DETECTOR.

The non-inverting input and an inverting input of the pre-amplifier Pre_Amplifier are arranged to receive a burst data packet from the burst transimpedance amplifier TIA; the fast recovery module is arranged to provide a fast recovery circuit to ensure the timing is correct, so that physical collision of two adjacent burst data packets before and after is avoided.

The output terminal of the pre-amplifier Pre_Amplifier is simultaneously connected to an input terminal of the 2.5 G burst limiting amplifier BurstLA 2.5 G and an input terminal of the signal detection unit.

The output terminal of the 2.5 G burst limiting amplifier BurstLA 2.5 G is connected to an input terminal of the current mode logic output buffer CML Buffer.

The output terminal of the signal detection unit is simultaneously connected to an input terminal of the signal detection output buffer Buffer and a control terminal for opening and closing of the current mode logic output buffer CML Buffer;

Two output terminals of the current mode logic output buffer CML Buffer are connected to output pins RX_OUTP and RX_OUTN of the burst mode receiver RX respectively.

The output of the signal detection output buffer Buffer is connected to a chip pin RX_SD, and the burst mode receiver RX sends a detection result to the host through the chip pin RX_SD.

When a reset signal is sent by a chip pin LA_RESET from the host, the chip sends a feedback signal to the host through the pin RX_SD.

The fast recovery module is built-in or external to the burst mode receiver RX.

Figure 2:
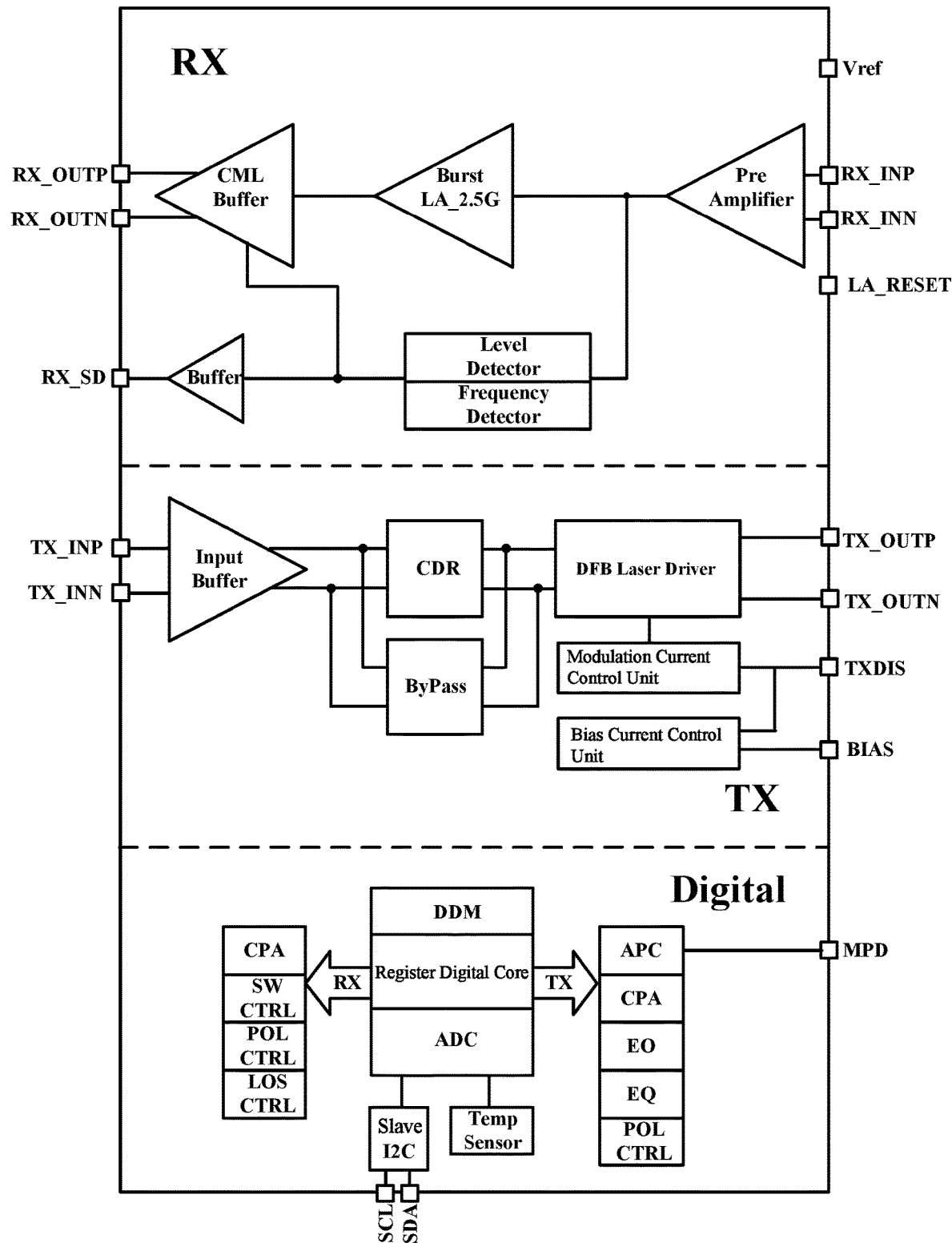
FIG. 2 is a structural schematic diagram of a 10 G rate OLT terminal transceiver integrated chip based on XGPON and DFB laser of FIG. 1 according to the present invention.

Referring to FIG. 1 and FIG. 2 of the drawings, the fast recovery module is external to the burst mode receiver RX. The fast recovery module includes resistors R7, R8, R9, R10, and switches S1, S2; a non-inverting output terminal of the burst transimpedance amplifier TIA is connected to one end of the resistor R10 of the fast recovery module, one end of the resistor R8 and a non-inverting input pin RX_INP of the chip through an AC coupling capacitor C9;

an inverting output terminal of the burst transimpedance amplifier TIA is connected to one end of the resistor R9 and one end of the resistor R7 of the fast recovery module, and an inverting input pin RX_INN of the chip through the AC coupling capacitor C8;

a non-inverting input pin RX_INP of the chip and an inverting input pin RX_INN of the chip are connected to a non-inverting input terminal and an inverting input terminal of the pre-amplifier Pre_Amplifier respectively;

another end of the resistor R10 is connected to one end of the switch S1;

another end of the resistor R9 is connected to one end of the switch S2;

control ends of the switches S1 and S2 are connected to a reset signal line LA_RESET simultaneously; and a reference voltage pin Vref of the burst mode receiver RX is simultaneously connected to another end of the resistor R7, another end of the R8, another end of the switch S1 and another end of the switch S2.

Figure 3:
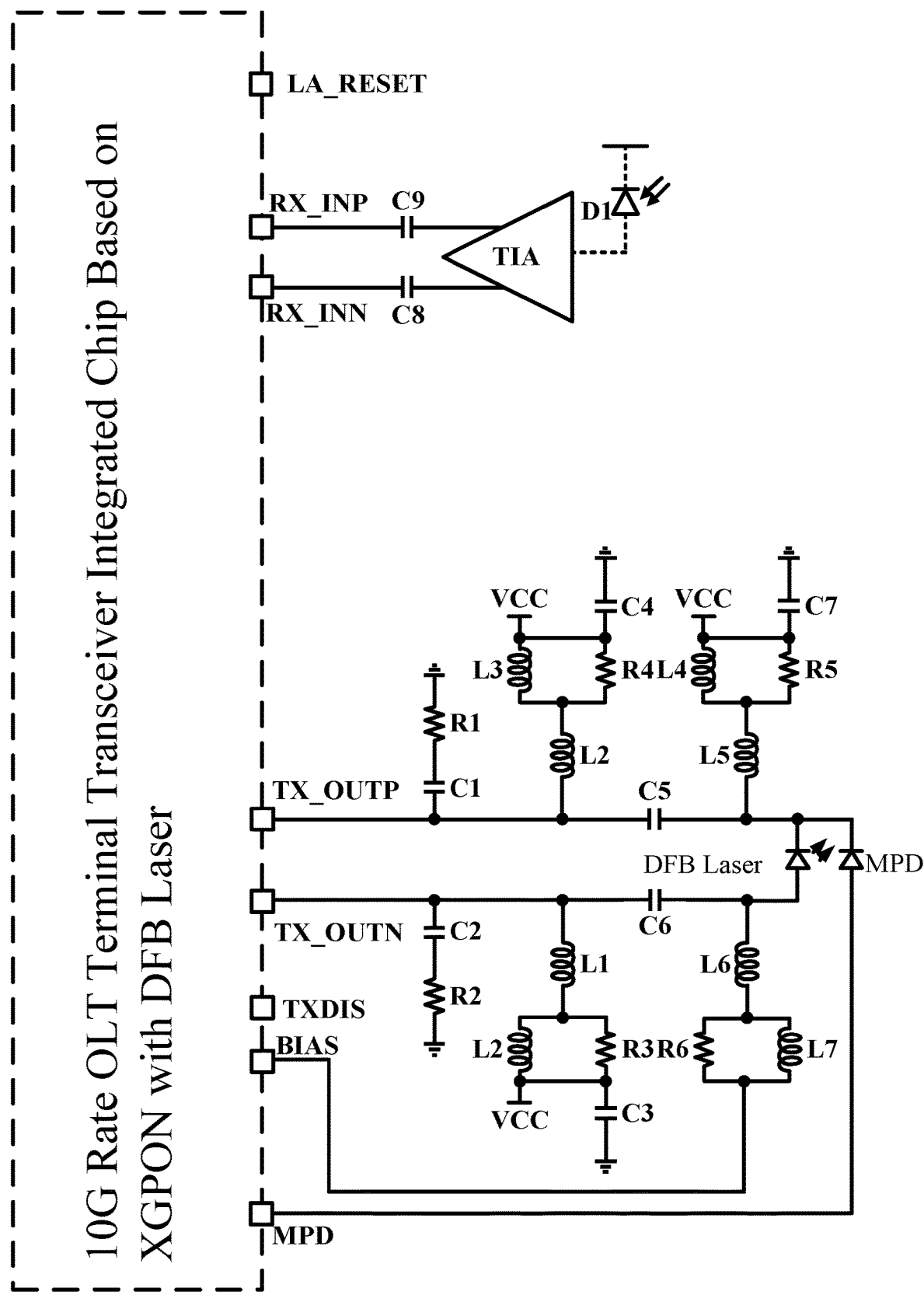
FIG. 3 is a schematic diagram based on XGPON with DFB laser, and an internal fast recovery circuit according to the present invention.
Figure 4:
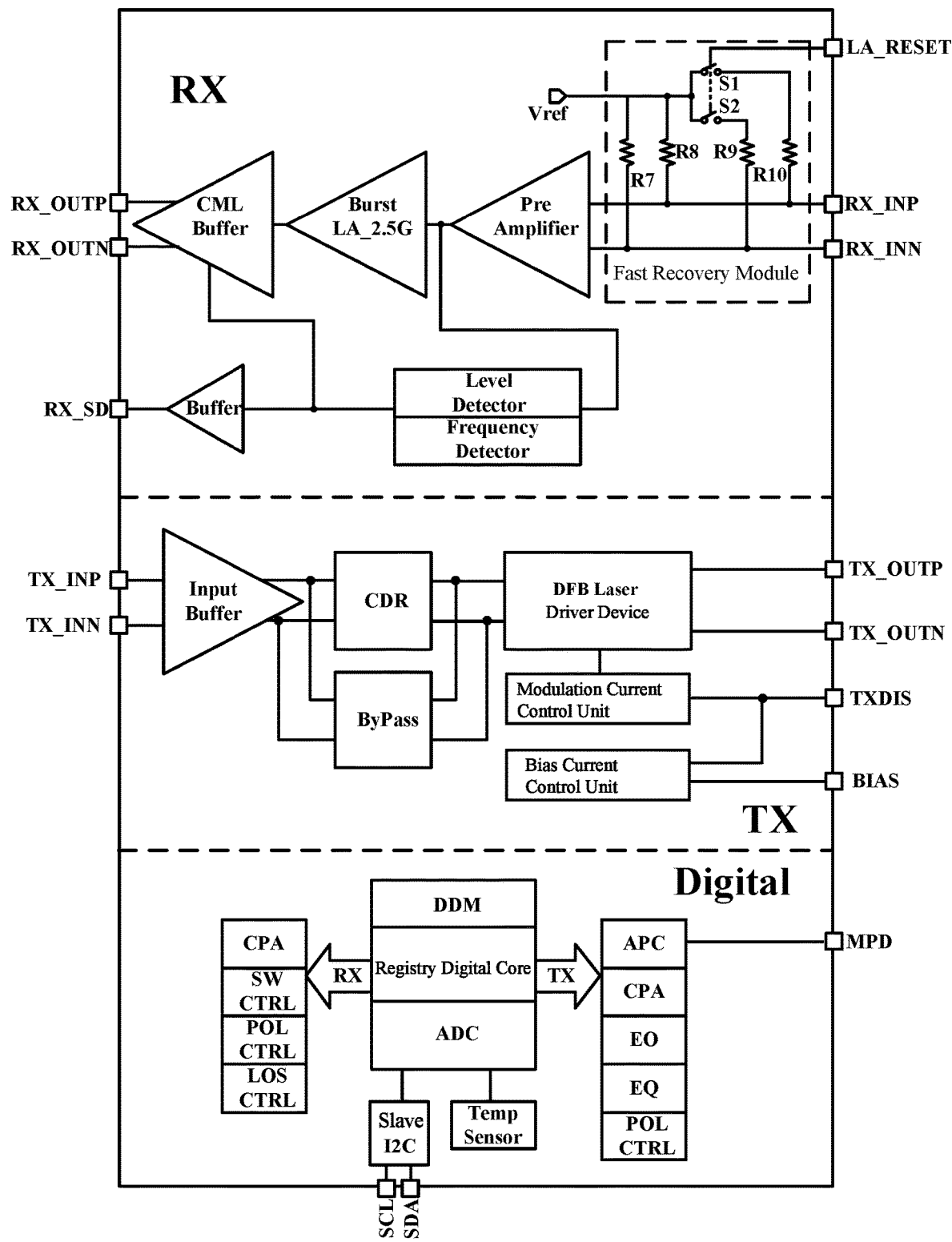
FIG. 4 is a structural schematic diagram of a 10 G rate OLT terminal transceiver integrated chip based on XGPON and DFB laser of FIG. 3 according to the present invention.

Referring to FIG. 3 and FIG. 4 of the drawings, the fast recovery module is built in the burst mode receiver RX. The fast recovery module includes resistors R7, R8, R9, R10, and switches S1, S2; a non-inverting output terminal and an inverting output terminal of the burst transimpedance amplifier TIA are connected to a non-inverting input pin RX_INP and an inverting input pin RX_INN of the chip through an AC coupling capacitor C9 and C8;

inside the chip, the non-inverting input pin RX_INP of the chip is connected to one end of the resistor R10, one end of the resistor R8 and the non-inverting input terminal of the pre-amplifier Pre_Amplifier;

the inverting input pin RX_INN of the chip is connected to one end of the resistor R9, one end of the resistor R7 and the inverting input of the pre-amplifier Pre_Amplifier;

another end of the resistor R10 is connected to one end of the switch S1;

another end of the resistor R9 is connected to one end of the switch S2;

control ends of the switches S1 and S2 are connected to a reset signal line LA_RESET of the chip simultaneously;

a reference voltage Vref of the burst mode receiver RX is simultaneously connected to another end of the resistor R7, another end of the R8, another end of the switch S1 and another end of the switch S2.

When the built-in configuration is used, the fast recovery module is built into the transceiver integrated chip, which has the advantage of reducing the footprint of the peripheral circuit and saving costs.

The working principles of the burst mode receiver RX: The OLT transceiver integrated chip located in the central office corresponds to multiple ONUs at the user end, therefore the receiving end of the OLT transceiver integrated chip needs to receive bursts of electrical signals of different amplitudes and frequencies from the ONU terminal (burst TIA has converted optical signals of different amplitudes into electrical signals and then sent them to the limiting amplifier LA of RX). The pre-amplifier Pre-Amplifier enhances (pre-emphasizes) the attenuated electrical signal output by the upper TIA, and then divides the electrical signal into two channels, one of which is passed to the LA_2.5 G limiting amplifier to amplify the signal to the limited state, and the other is transmitted to the signal detection unit. The signal detection unit detects the amplitude and frequency of the signal at the same time. Only when the amplitude and waveform pulse width meet the threshold requirements, the unit outputs a command to turn on the output driver stage CML Buffer, and at the same time transmits the judgment result to the host outside the chip (through the RX_SD pin). In order to meet the strict protocol timing requirements of XGPON, a fast recovery circuit must be added in the RX part, so that after the burst LA completes the reception of a data packet, it can immediately return to the normal state, and then continue to receive the next burst data packet such that the physical collision of two adjacent data packets can be avoided. The chip pin Vref provides a DC operating point for the two input terminals of LA, and also discharges the charge of the capacitors C8 and C9 connected to the two input terminals of LA. When the reset signal LA_RESET is 0, the switches S1 and S2 are turned off, and the charge on the capacitor is slowly released to the ground through the resistor R7=R8 (large resistance). When the reset signal LA_RESET is 1, the switches S1 and S2 are turned on, and the charge on the capacitor is quickly discharged to the ground through the resistor R9=R10 (small resistance value) so as to achieve the quickly rebuilding of the DC operating point. By adjusting the resistance of resistors R7, R8, R9, R10, the performance requirements and timing requirements of RX is met. The resistance values of the resistors R7, R8, R9 and R10 can be artificially set through the two communication signal lines of the digital part. The voltage value of Vref can be artificially set through the two communication signal lines of the digital part. The reset signal LA_RESET is given by the host.

The continuous mode transmitter TX comprises an input buffer Input Buffer, a bypass ByPass, a clock data recovery CDR, a DFB laser driver, a bias current control unit and a modulation current control unit, one of the bypass ByPass or the clock data recovery CDR path is selected to activate;

an attenuated signal formed by an original high-speed electrical signal passing through a metal trace on a PCB is connected to the input buffer Input Buffer through the chip pins TX_INP and TX_INN, then the input buffer Input Buffer transmits the attenuated signal to the input end of the DFB laser driver along an open path;

a bias current output terminal of the bias current control unit is connected to the chip pin BIAS, and provides a bias current for the DFB laser;

a modulation current output terminal of the modulation current control unit is connected to a modulation current input terminal of the DFB laser driver;

an output terminal of the DFB laser driver is connected to the chip pins TX_OUTP and TX_OUTN, and the DFB laser driver provides modulation current for the DFB laser;

the host computer sends commands to the chip to turn off the bias current and the modulation current through the chip pin TXDIS to turn off the continuous mode transmitter TX.

The activation of one of the bypass ByPass or the clock data recovery CDR path is controlled by digital control unit Digital according to an external command.

The activation of one of the bypass ByPass or the clock data recovery CDR path is controlled through the host automatically switching the channel by itself, when the rate is below 8 G, the signal attenuation is not serious, and the bypass ByPass is activated; when the rate is 8 G-14 G, the signal attenuation is serious, and the clock data recovery CDR path is activated under the control of the host.

The working principles of continuous mode transmitter TX: The TX part of the main channel is capable of receiving and processing continuous electrical signal data streams with a rate of 1-14 Gbps. The original high-speed electrical signal is attenuated after passing through the metal traces on the PCB, resulting in signal errors. In order to solve the problem of high-speed signal attenuation, CDR (clock data recovery) is added inside TX to improve the quality of high-speed signal. If the attenuation of the high-speed signal is not serious, it can also be transmitted directly from the ByPass path. DFB type lasers support long-distance ($\geq$10 km) data transmission, so TX needs to provide a driver with high output current 10 G DFB DRIVER. The bias current Bias and modulation current Modulation of the laser need to adjust the current in real time according to the ambient temperature, the luminous efficiency of the laser, and the aging of the laser. Therefore, the Current Control module cooperates with the APC optical power control module to feed back the laser luminous power information collected by the monitoring photodiode MPD, and configure a reasonable current value through the data writing of the digital part.

The activation of one of the bypass ByPass or the clock data recovery CDR path includes the following two configurations:

Type 1: Pre-judgment, and then write the external command into the digital control unit Digital through the SAD pin according to the judgment result, and the digital control unit Digital sends the selection command to the TX. Pre-judgment refers to the selection of the bypass ByPass path or the clock data recovery CDR path, which is judged based on the attenuation of the signal measured by the chip. Before using the chip, first detect the attenuated signal generated after passing through the metal wiring on the PCB board, and check whether the quality of the TX output eye diagram meets the protocol standard. If it meets the standard, it will be transmitted from bypass ByPass, and if it does not meet the standard, CDR will be turned on to optimize the signal quality.

Type 2: The host switches channels by itself. When the rate is below 8 G, the signal attenuation is not serious, and ByPass is activated; when the rate is 8 G-14 G, the signal attenuation is serious, and the host controls the clock data recovery CDR path to optimize signal quality.

The digital control unit Digital comprises a register digital core, an analog-to-digital converter ADC, a $I^2C$ slave and temperature sensor Temp Sensor;

an output terminal of the temperature sensor Temp Sensor is connected to a temperature signal input terminal of the register digital core through the analog-to-digital converter ADC;

an input terminal of $I^2C$ slave is connected to a pin SCL of a clock chip; an input and output ports of $I^2C$ slave are connected to a pin SDA of an external command chip; an output terminal of $I^2C$ slave is connected to an external command input terminal of the register digital core, and the register digital core controls a path selection of the continuous mode transmitter TX; the register digital core also realizes a configuration of the burst mode receiver RX and the continuous mode transmitter TX through a control port.

The control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

The control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL;

an input terminal of the optical power control port APC is connected to a chip pin MPD for monitoring current.

The working principle of the digital control unit Digital: The digital control unit Digital can complete the internal configuration of the burst mode receiver RX and the continuous mode transmitter TX.

The functions configurable in the burst mode receiver RX are:

eye diagram cross point adjustment CPA, output swing control SW_CTRL, output polarity inversion POL_CTRL, signal loss threshold setting and mode selection LOS_CTRL, etc.

The configurable functions in the continuous mode transmitter TX are:

laser optical power control APC, eye diagram intersection optimization CPA, jitter optimization EQ, eye diagram optimization EO, output polarity inversion POL_CTRL, etc.

The built-in high-precision multi-bit ADC converts the ambient temperature collected by the temperature sensor Temp Sensor into a digital value and then reads it to the outside through the $I^2C$ slave data signal line SDA. ADC can also read other quantifiable data to the outside through I2C slave, such as monitoring current value, bias current value, modulation current value, etc. Users can also write digital quantities to the register digital core inside the chip through the master $I^2C$ outside the chip to optimize the transmission performance of the integrated transceiver chip.

The digital control unit also adds a digital diagnostic monitoring (DDM) function to monitor light level, chip temperature, power supply voltage and other data in real time.

According to the present invention, the 10 G rate OLT terminal transceiver integrated chip based on XGPON and DFB laser uses amplitude detection and frequency detection at the 2.5 G burst receiving end RX to simultaneously judge whether the input signal meets the requirements of the transmission protocol, and can have a built-in or external fast recovery circuit, which can allow the AC coupling capacitor to quickly discharge the charge and establish a stable working point for the next data packet reception. A high-speed clock data recovery unit CDR is built in the 10 G continuous transmitting end TX to ensure the integrity of the electrical signal to be transmitted, which is conducive to the laser emitting high-quality light. In order to drive long-distance high-speed DFB lasers, the built-in high-speed laser driver cooperates with the bias current and modulation current modules to output large current. In the digital control unit, there are built-in multi-bit registers, high-precision ADC and $I^2C$ slave. All kinds of key data are transmitted to the outside through the SDA signal line, and the digital quantities of related modules with optimized performance can also be written through this line to ensure the high quality of the receiving signal and sending model of the transceiver integrated chip. The DDM module reads the key working information in the chip in real time, and when the threshold is exceeded, the integrated transceiver chip can be turned off to avoid damage to the chip and laser.

Although the present invention is described herein with reference to specific embodiments, it should be understood that these embodiments are merely illustrative of the principles and applications of the present invention. It is therefore to be understood that numerous modifications may be made to the exemplary embodiments and that other arrangements may be devised without departing from the spirit and scope of the present invention as defined by the appended claims. It shall be understood that different dependent claims and features described herein may be combined in a different way than that described in the original claims. It should also be appreciated that features described in connection with individual embodiments can be used in other described embodiments.

What is claimed is:

1. A 10 G rate OLT terminal transceiver integrated chip based on XGPON and DFB laser, comprising:
a burst mode receiver RX, a continuous mode transmitter TX and a digital control unit DIGIITAL,
wherein an optical signal received from each one ONU client is processed through a burst TIA into an electrical signal, then the burst-mode receiver RX amplifies the electrical signal, processes double-detection for amplitude and frequency of the electrical signal, to determine if an amplitude and a waveform pulse width of the electrical signal meet threshold requirements related to meeting a XGPON protocol, and outputs a detection result of the electrical signal to a host, and uses a fast recovery module to control a timing to meet the XGPON protocol;

the continuous mode transmitter TX receives an original high speed electrical signal attenuated by a PCB board, and in response to a degree of attenuation, selects a bypass BYPASS path for transmission or outputs the signal after a signal quality is improved by processing through a clock data recovery CDR path; and the digital control unit DIGIITAL is used to provide control signals for the burst mode receiver RX and the continuous mode transmitter TX.

2. The 10 G rate OLT terminal transceiver integrated chip based on XGPON and DFB laser according to claim 1, wherein the burst mode receiver RX comprises a pre-amplifier Pre_Amplifier, a signal detection unit, a 2.5 G burst limiting amplifier BurstLA 2.5 G, a current mode logic output buffer CML Buffer, a signal detection output buffer Buffer and a fast recovery module, wherein the signal detection unit comprises a level detector LEVEL DETECTOR and a frequency detector FREQUENCY DETECTOR, a non-inverting input and an inverting input of the pre-amplifier Pre_Amplifier are arranged to receive a burst data packet (the electrical signal) from the burst transimpedance amplifier TIA;

the fast recovery module is arranged to provide a fast recovery circuit to ensure the timing is correct, so that physical collision of two adjacently sequenced burst data packets before and after is avoided;

an output terminal of the pre-amplifier Pre_Amplifier is simultaneously connected to an input terminal of the 2.5 G burst limiting amplifier BurstLA 2.5 G and an input terminal of the signal detection unit;

an output terminal of the 2.5 G burst limiting amplifier BurstLA 2.5 G is connected to an input terminal of the current mode logic output buffer CML Buffer;

an output terminal of the signal detection unit is simultaneously connected to an input terminal of the signal detection output buffer Buffer and a control terminal for opening and closing of the current mode logic output buffer CML Buffer;

two output terminals of the current mode logic output buffer CML Buffer are connected to output pins RX_OUTP and RX_OUTN of the burst mode receiver RX respectively;

an output of the signal detection output buffer Buffer is connected to a chip pin RX_SD, and the burst mode receiver RX sends a detection result of amplitude and frequency to the host through the chip pin RX_SD;

wherein in response to a reset signal sent by a chip pin LA_RESET from the host, a chip sends a feedback signal to the host through the pin RX_SD.

3. The 10 G rate OLT terminal transceiver integrated chip based on XGPON and DFB laser according to claim 2, wherein the fast recovery module is built-in or external to the burst mode receiver RX, and the fast recovery module includes resistors R7, R8, R9, R10, and switches S1, S2, when the fast recovery module is external to the burst mode receiver RX, a non-inverting output terminal of the burst transimpedance amplifier TIA is connected to one end of the resistor R10 of the fast recovery module, one end of the resistor R8 and a non-inverting input pin RX_INP of the chip through an AC coupling capacitor C9;

an inverting output terminal of the burst transimpedance amplifier TIA is connected to one end of the resistor R9 and one end of the resistor R7 of the fast recovery module, and an inverting input pin RX_INN of the chip through the AC coupling capacitor C8;

a non-inverting input pin RX_INP of the chip and an inverting input pin RX_INN of the chip are connected to a non-inverting input terminal and an inverting input terminal of the pre-amplifier Pre_Amplifier respectively;

another end of the resistor R10 is connected to one end of the switch S1;

another end of the resistor R9 is connected to one end of the switch S2;

control ends of the switches S1 and S2 are connected to a reset signal line LA_RESET simultaneously;

a reference voltage pin Vref of the burst mode receiver RX is simultaneously connected to another end of the resistor R7, another end of the R8, another end of the switch S1 and another end of the switch S2;

when the fast recovery module is built in the burst mode receiver RX, a non-inverting output terminal and an inverting output terminal of the burst transimpedance amplifier TIA are connected to a non-inverting input pin RX_INP and an inverting input pin RX_INN of the chip through an AC coupling capacitor C9 and C8;

inside the chip, the non-inverting input pin RX_INP of the chip is connected to one end of the resistor R10, one end of the resistor R8 and the non-inverting input terminal of the pre-amplifier Pre_Amplifier;

the inverting input pin RX_INN of the chip is connected to one end of the resistor R9, one end of the resistor R7 and the inverting input of the pre-amplifier Pre_Amplifier;

another end of the resistor R10 is connected to one end of the switch S1;

another end of the resistor R9 is connected to one end of the switch S2;

control ends of the switches S1 and S2 are connected to a reset signal line LA_RESET of the chip simultaneously;

a reference voltage Vref of the burst mode receiver RX is simultaneously connected to another end of the resistor R7, another end of the R8, another end of the switch S1 and another end of the switch S2.

4. The 10 G rate OLT terminal transceiver integrated chip based on XGPON and DFB laser according to claim 1, wherein the continuous mode transmitter TX comprises an input buffer Input Buffer, a bypass ByPass, a clock data recovery CDR, a DFB laser driver, a bias current control unit and a modulation current control unit, one of the bypass ByPass or the clock data recovery CDR path is selected to activate, an attenuated signal formed by an original high-speed electrical signal (a burst data packet) passing through a metal trace on a PCB is connected to the input buffer Input Buffer through the-chip pins TX_INP and TX_INN, then the input buffer Input Buffer transmits the attenuated signal to the input end of the DFB laser driver along an open path;

a bias current output terminal of the bias current control unit is connected to a chip pin BIAS, and provides a bias current for the DFB laser;

a modulation current output terminal of the modulation current control unit is connected to a modulation current input terminal of the DFB laser driver;

an output terminal of the DFB laser driver is connected to chip pins TX_OUTP and TX_OUTN, and the DFB laser driver provides modulation current for the DFB laser;

a host computer sends commands to the chip to turn off the bias current and the modulation current through the chip pin TXDIS to turn off the continuous mode transmitter TX.

5. The 10 G rate OLT terminal transceiver integrated chip based on XGPON and DFB laser according to claim 4, the selection of one of the bypass ByPass or the clock data recovery CDR path is controlled by digital control unit Digital according to an external command.

6. The 10 G rate OLT terminal transceiver integrated chip based on XGPON and DFB laser according to claim 4, the selection of one of the bypass ByPass or the clock data recovery CDR path is controlled through the host switching the channel automatically based on the rate of the original high-speed electrical signal, when the rate of the original high-speed electrical signal is below 8 G, the bypass ByPass is activated; when the rate of the original high-speed electrical signal is 8 G-14 G, the clock data recovery CDR path is activated under the control of the host.

7. The 10 G rate OLT terminal transceiver integrated chip based on XGPON and DFB laser according to claim 4, the digital control unit Digital comprises a register digital core, an analog-to-digital converter ADC, a I2C slave and temperature sensor Temp Sensor;

an output terminal of the temperature sensor Temp Sensor is connected to a temperature signal input terminal of the register digital core through the analog-to-digital converter ADC;

an input terminal of I²C slave is connected to a pin SCL of a clock chip; an input and output ports of I²C slave are connected to a pin SDA of an external command chip; an output terminal of I²C slave is connected to an external command input terminal of the register digital core, and the register digital core controls a path selection of the continuous mode transmitter TX; the register digital core also realizes a configuration of the burst mode receiver RX and the continuous mode transmitter TX through a control port.

8. The 10 G rate OLT terminal transceiver integrated chip based on XGPON and DFB laser according to claim 7, the control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

9. The 10 G rate OLT terminal transceiver integrated chip based on XGPON and DFB laser according to claim 7, the control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL;

an input terminal of the optical power control port APC is connected to a chip pin MPD for monitoring current.

* * * * *